(12) United States Patent
Chen

(10) Patent No.: US 12,473,848 B1
(45) Date of Patent: Nov. 18, 2025

(54) PORTABLE OIL PUMP WITH CHARGING FUNCTION

(71) Applicant: STAR SMART LIMITED, Hongkong (HK)

(72) Inventor: Zhijie Chen, Guangdong (CN)

(73) Assignee: STAR SMART LIMITED, Hongkong (HK)

( * ) Notice: Subject to any disclaimer, the term of this patent is extended or adjusted under 35 U.S.C. 154(b) by 0 days.

(21) Appl. No.: 19/216,034

(22) Filed: May 22, 2025

(30) Foreign Application Priority Data

| Apr. 23, 2025 | (CN) | 202520781380.0 |
| Apr. 23, 2025 | (CN) | 202520781427.3 |
| Apr. 23, 2025 | (CN) | 202520781454.0 |
| Apr. 23, 2025 | (CN) | 202520785126.8 |

(51) Int. Cl.
*F01M 11/04* (2006.01)
*F16N 37/00* (2006.01)

(52) U.S. Cl.
CPC ......... *F01M 11/0458* (2013.01); *F16N 37/00* (2013.01)

(58) Field of Classification Search
CPC .............................. F16N 37/00; F01M 11/0458
See application file for complete search history.

(56) References Cited

U.S. PATENT DOCUMENTS

| 11,092,283 | B2 * | 8/2021 | Lee | F16N 25/00 |
| 2019/0194011 | A1 * | 6/2019 | Edler | B67D 7/3263 |

* cited by examiner

*Primary Examiner* — Robert Grant

(57) ABSTRACT

A portable oil pump with a charging function includes a main unit, an oil pumping pipe, a pump body, and an oil outlet pipe. The oil pumping pipe is connected to the main unit. The oil outlet pipe is in communication with the oil pumping pipe. The pump body is arranged inside the oil pumping pipe. The main unit is equipped with a circuit board, a battery, and a power interface. The battery is a rechargeable battery. A charging unit, a main control unit and a driving unit are integrated on the circuit board. The power interface is used for connecting to a first power signal and transmitting the connected first power signal to the charging unit. The charging unit is used for converting the first power signal into a second power signal for charging the battery.

20 Claims, 15 Drawing Sheets

8

PORTABLE OIL PUMP WITH CHARGING FUNCTION

CROSS-REFERENCE TO RELATED APPLICATIONS

The application claims priorities of Chinese Patent Application No. CN2025207814273, filed on Apr. 23, 2025, Chinese Patent Application No. CN2025207851268, filed on Apr. 23, 2025, Chinese Patent Application No. CN2025207813800, filed on Apr. 23, 2025, and Chinese Patent Application No. CN2025207814540, filed on Apr. 23, 2025, the entire contents of which are incorporated herein by reference.

TECHNICAL FIELD

The present invention relates to the technical field of oil pumps, and in particular, to a portable oil pump with a charging function.

BACKGROUND ART

As is well known, a portable oil pump refers to an electronic product that is convenient for users to carry and use, and is used to pump oil such as gasoline and diesel from one container to another. Generally, the portable oil pump includes a main unit, an oil pumping pipe, an oil outlet pipe, and a pump body. The main unit is internally equipped with a battery and a circuit board. The battery is used for supplying power to the circuit board and the pump body. The circuit board is also electrically connected to the pump body to control the the pump body to work. The pump body is arranged inside the oil pumping pipe. When the circuit board drives the pump body to work, the oil is discharged from the oil outlet pipe after passing through the oil pumping pipe. However, currently, the existing batteries generally use dry batteries, which cannot be recharged. The battery level of the dry batteries decreases with use, and discarding old batteries after replacement is not environmentally friendly. Moreover, after being used for a period of time or left unused for a certain period, the dry batteries may output unstable power, and the power output to the pump body may not meet the requirements, which affects the oil pumping speed of the pump body, resulting in slow oil pumping and affecting the use of the user.

SUMMARY

The main objective of the present invention is to provide a portable oil pump with a charging function, aiming to address the problem of non-environmental protection caused by the use of dry batteries in existing portable oil pumps and the problem that a power output to a pump body fails to meet requirements after long-term storage.

In order to solve the above technical problems, the present invention provides the following technical solution.

A portable oil pump with a charging function includes a main unit, an oil pumping pipe, a pump body, and an oil outlet pipe. The oil pumping pipe is connected to the main unit. The oil outlet pipe is connected to a position of the oil pumping pipe adjacent to the main unit and is in communication with the oil pumping pipe. The pump body is arranged inside the oil pumping pipe at one end away from the main unit. The main unit is equipped with a circuit board, a battery, and a power interface. The battery is a rechargeable battery.

A charging unit, a main control unit and a driving unit are integrated on the circuit board. The charging unit is electrically connected to the power interface, the main control unit, and the battery, respectively. The main control unit is electrically connected to the charging unit, the driving unit, and the battery, respectively. The battery is electrically connected to the driving unit, the charging unit, and the pump body, respectively.

The power interface is used for connecting to a first power signal and transmitting the connected first power signal to the charging unit. The charging unit is used for converting the first power signal into a second power signal for charging the battery. The main control unit controls the on-off of the power supply from the battery to the pump body through the driving unit. A voltage range of a power source connected to the power interface is 5V-75V.

The present invention has the following beneficial effects. Compared with the prior art, in the present invention, the rechargeable battery is built in the main unit, and the power interface and the charging unit adapted to charge the battery are provided. After the power interface is connected to a power source, the battery can be charged through the charging unit, enabling the battery to continue to be used without replacing the battery, which plays a role in environmental protection. Moreover, the rechargeable battery provides a more stable output voltage compared with a dry battery, and the output voltage will not be affected by the decrease of a battery level of the battery. Therefore, the battery can provide a relatively stable voltage to the pump body, thereby maintaining the oil pumping rate of the pump body.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
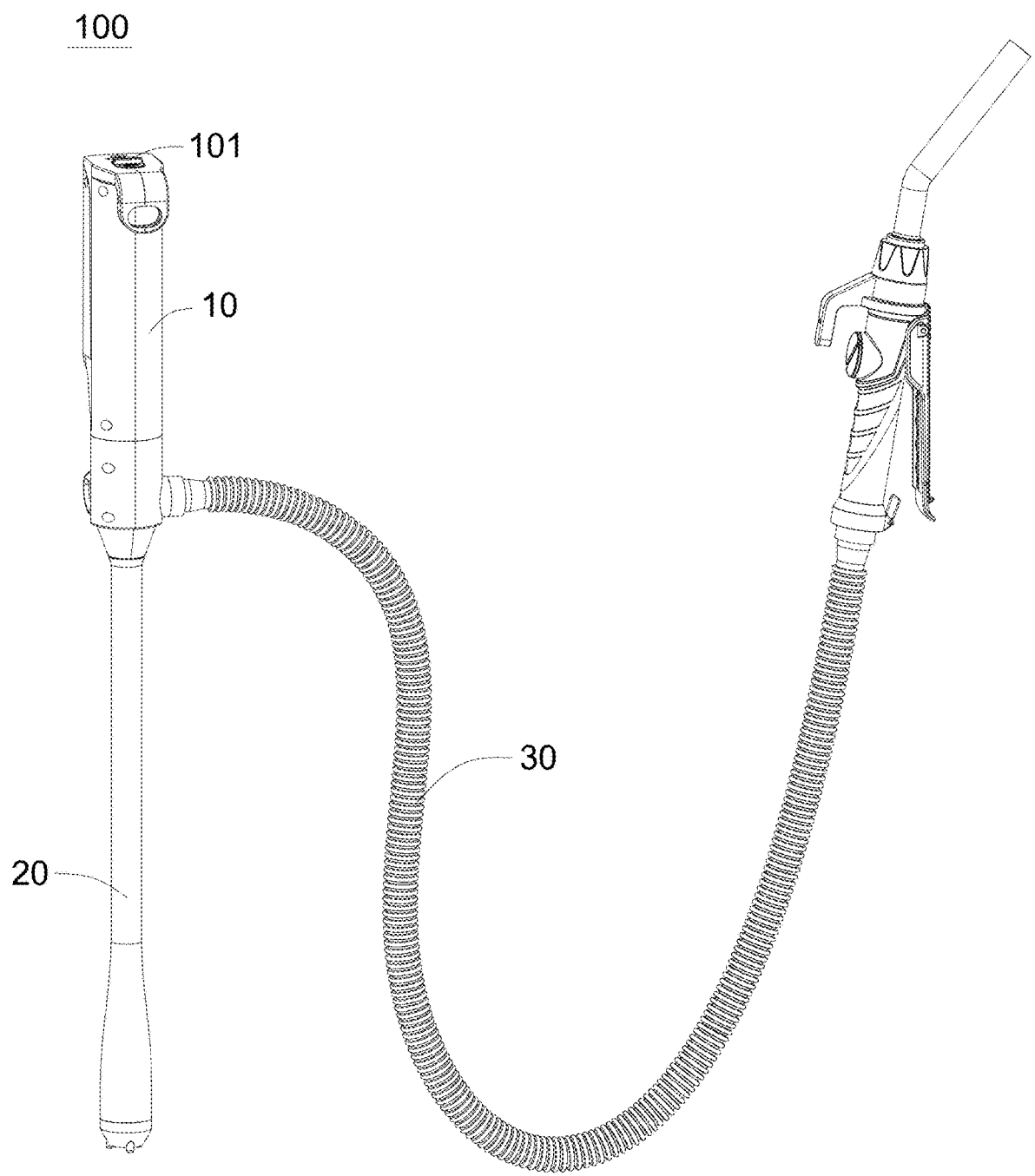
FIG. 1 is a perspective view of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
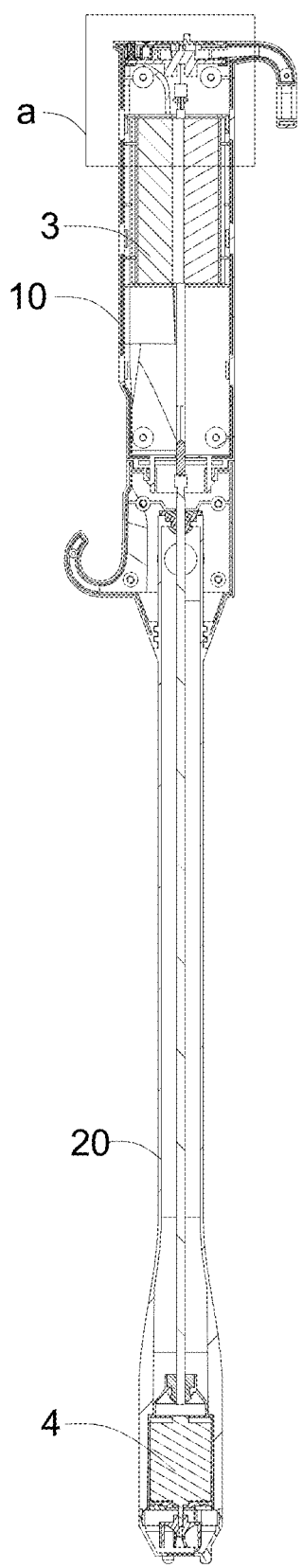
FIG. 2 is a cross-sectional view of the present invention with an oil outlet pipe removed and taken along a center line of an oil pumping pipe.
Figure 3:
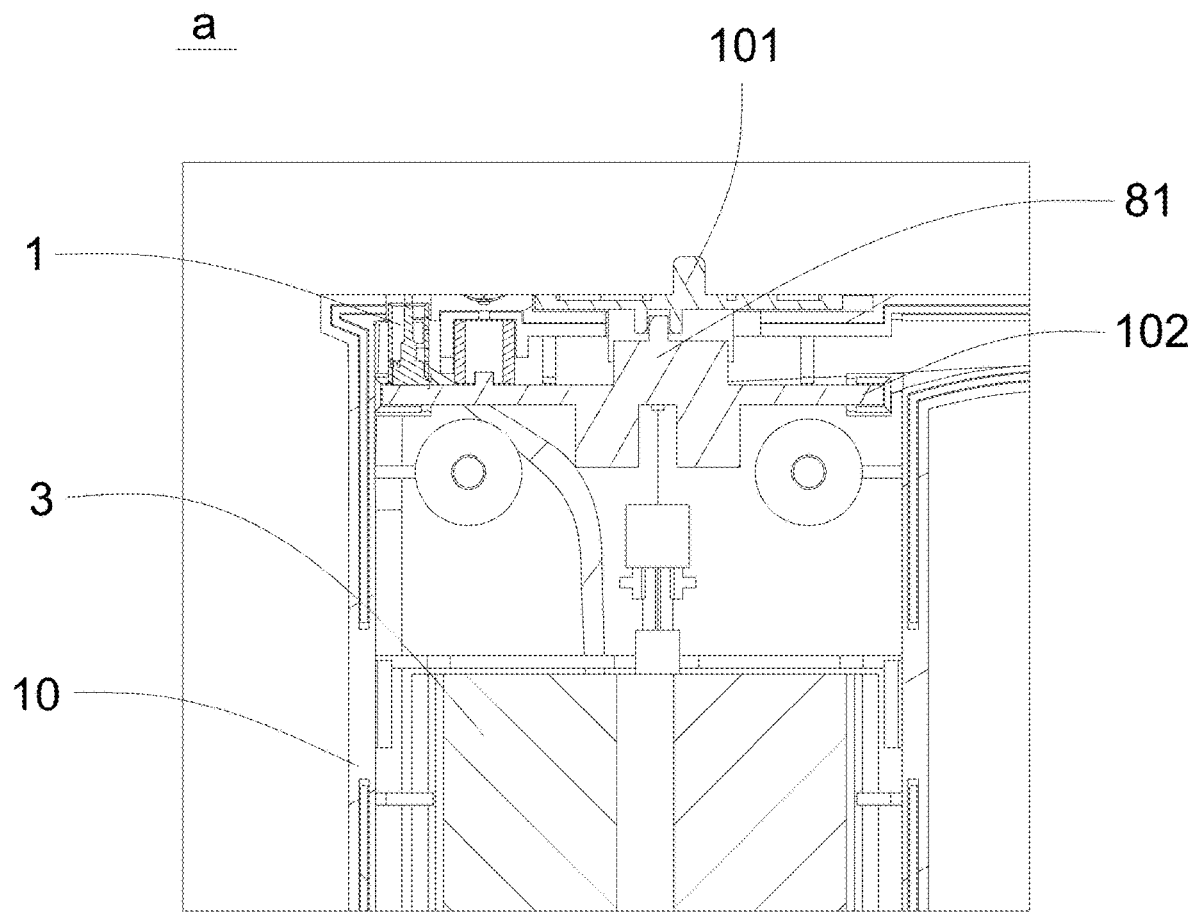
FIG. 3 is an enlarged view of area a in FIG. 2.
Figure 4:
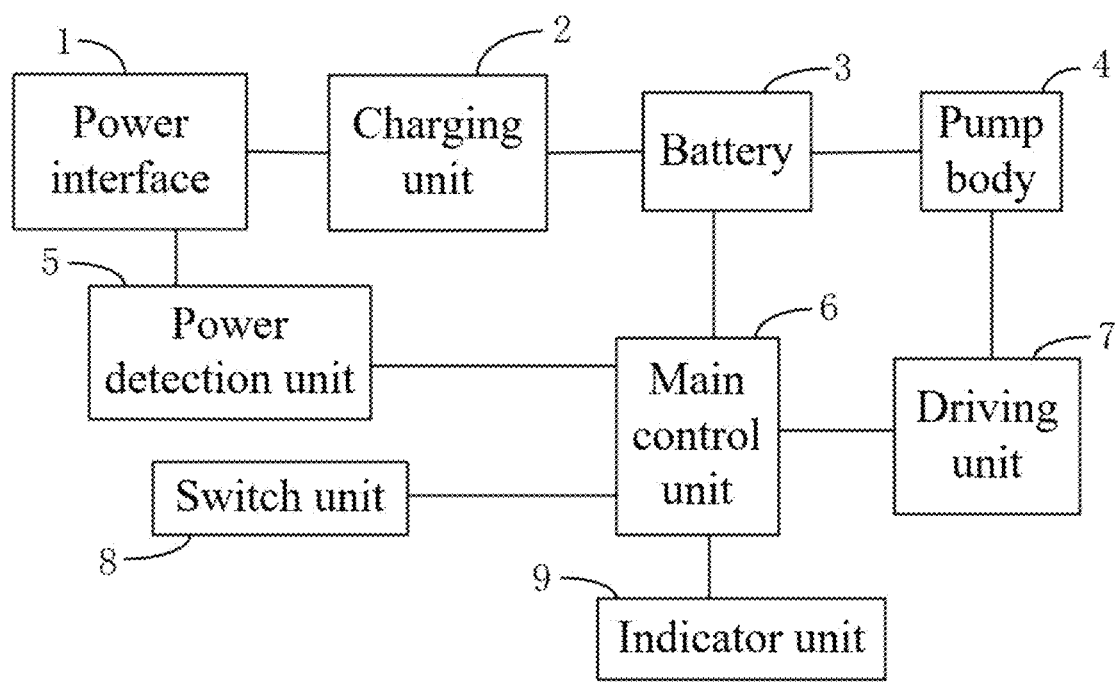
FIG. 4 is a principle block diagram of the present invention.
Figure 5:
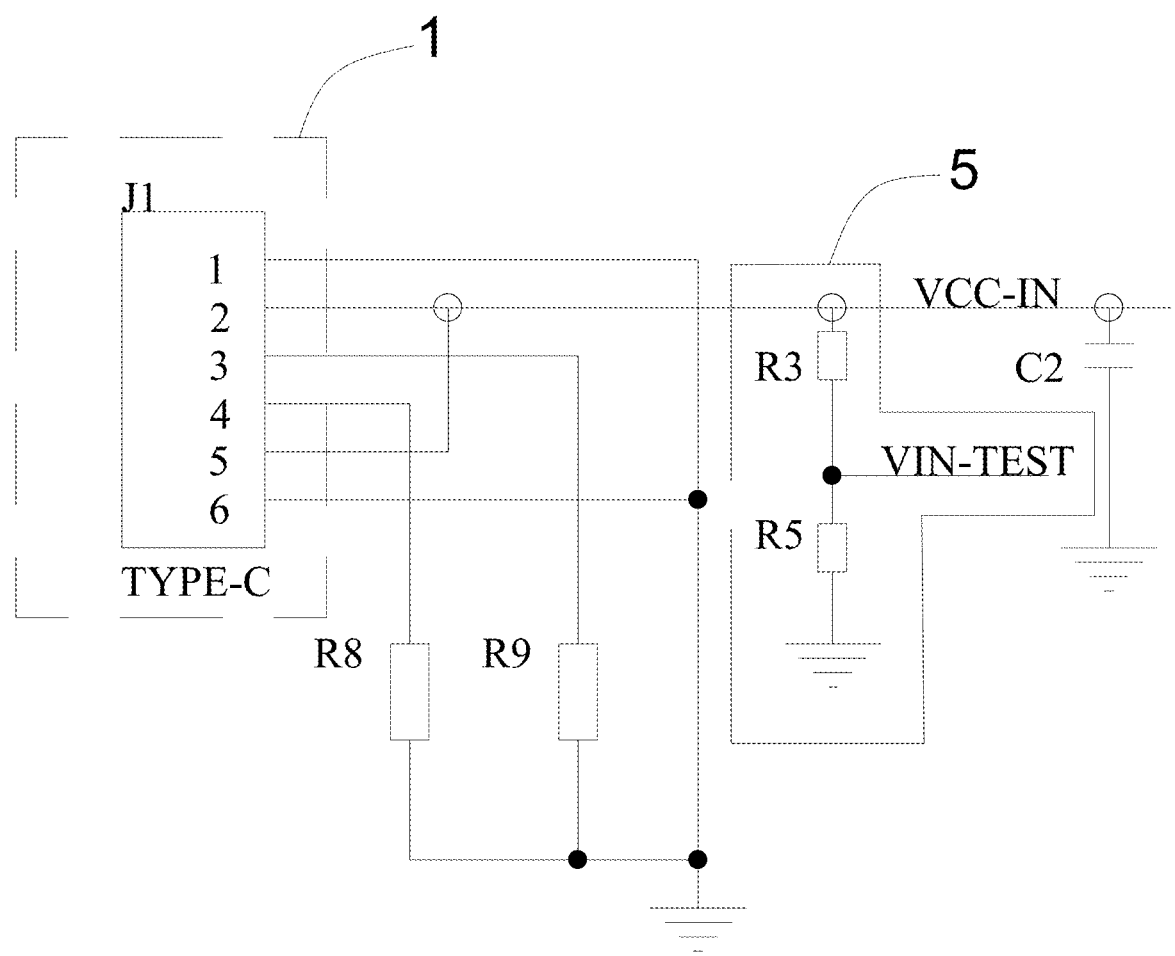
FIG. 5 is a circuit diagram of the electrical connection between a power interface and a power detection unit of the present invention.
Figure 6:
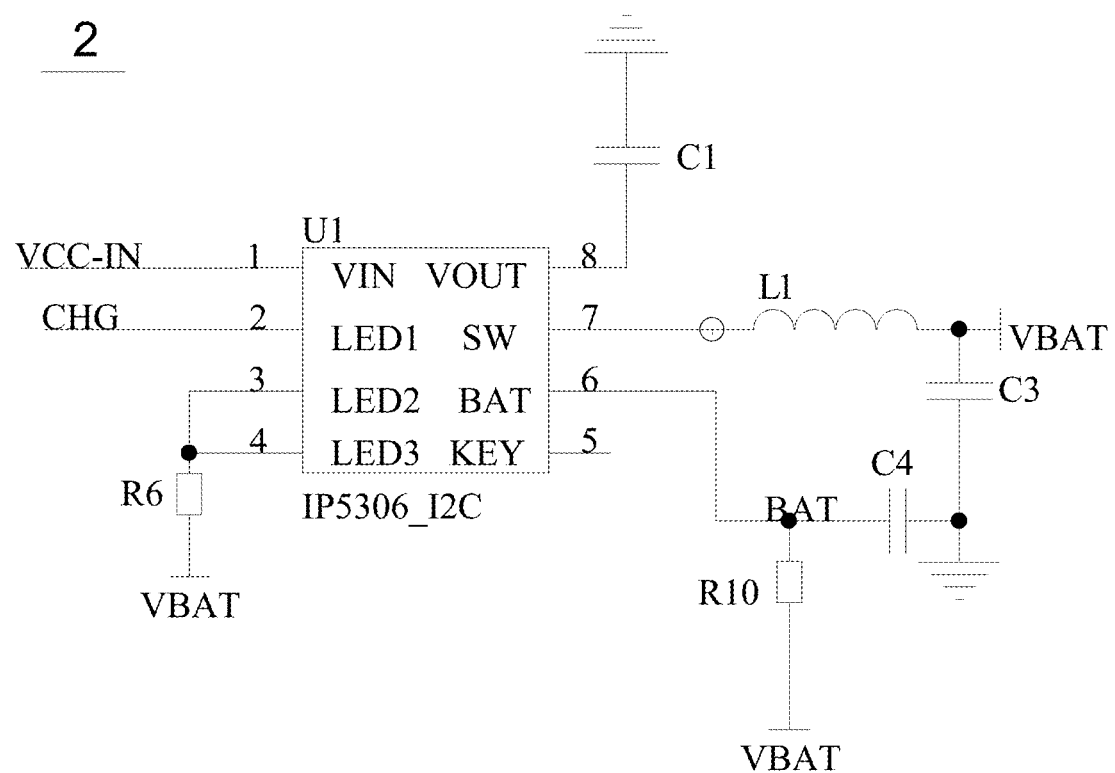
FIG. 6 is a circuit diagram of a charging unit of the present invention.
Figure 7:
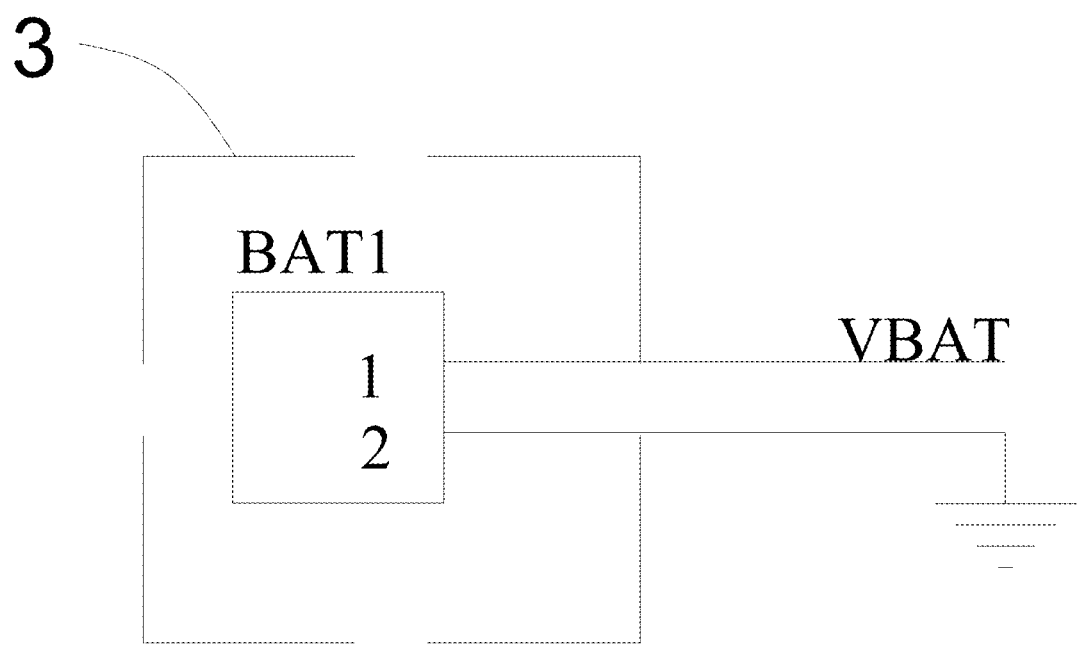
FIG. 7 is a schematic circuit diagram of a battery of the present invention.
Figure 8:
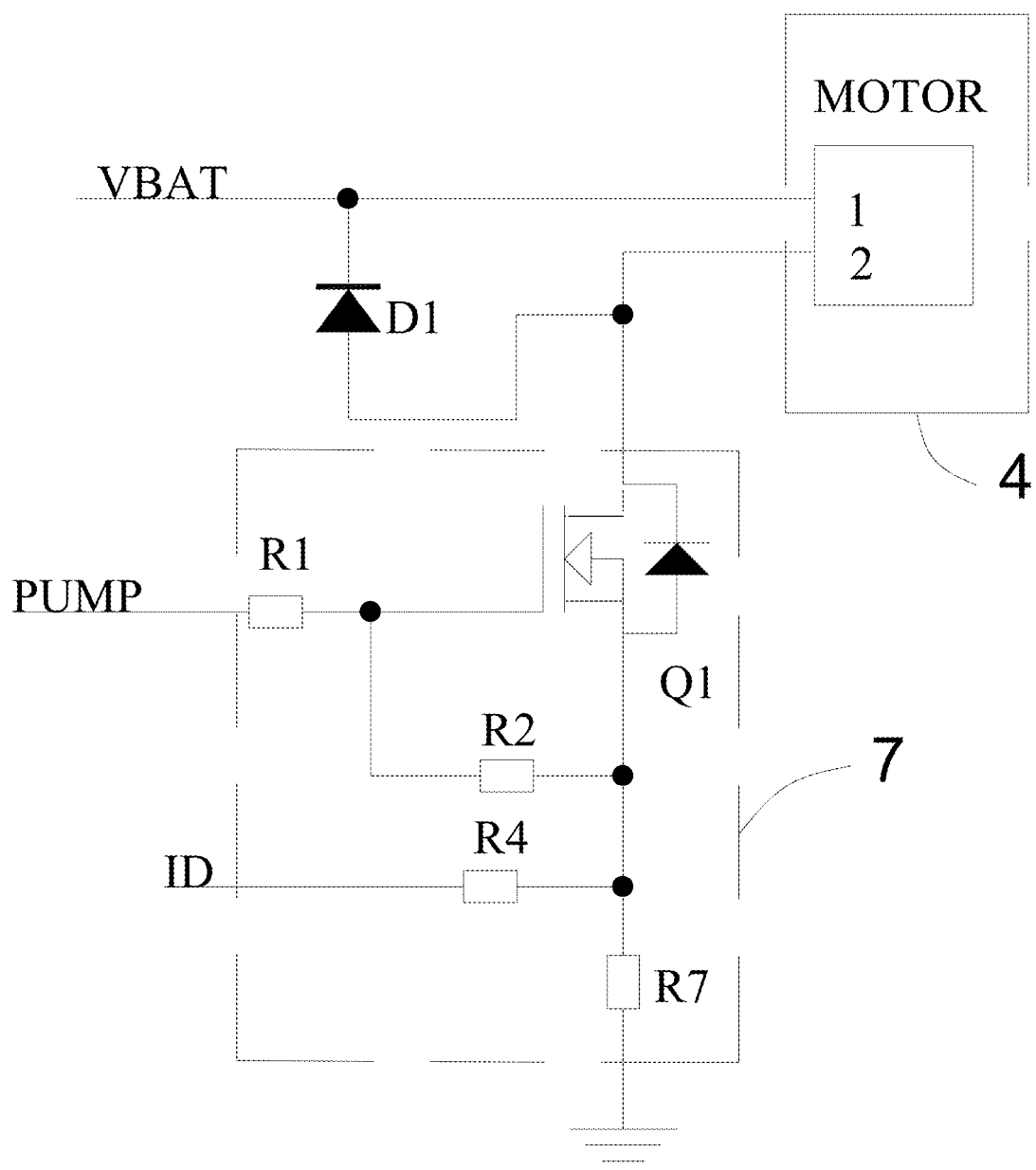
FIG. 8 is a circuit diagram of the electrical connection between a pump body and a driving unit of the present invention.
Figure 9:
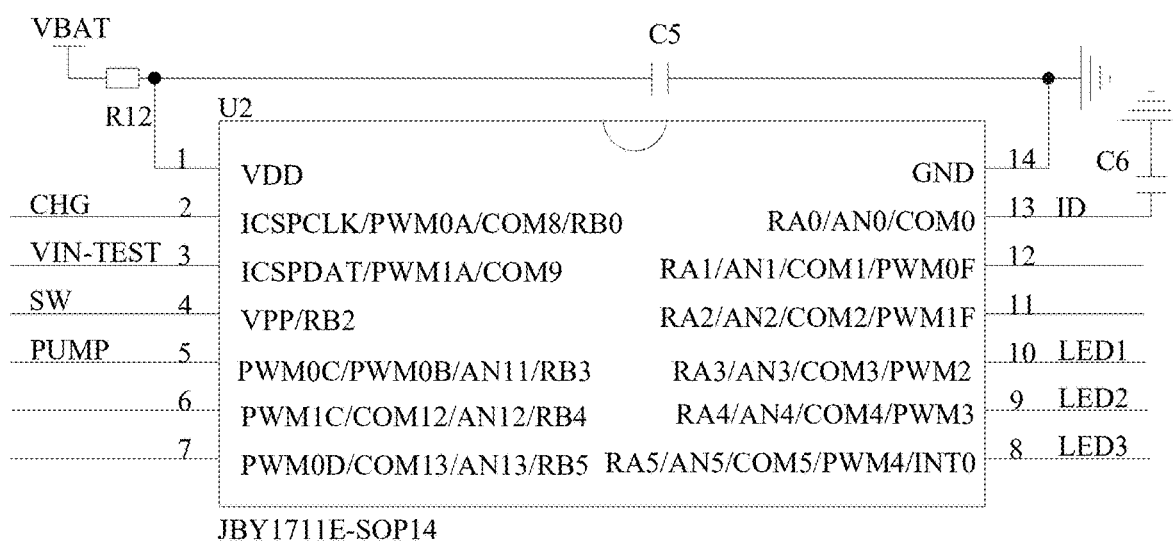
FIG. 9 is a circuit diagram of a main control unit of the present invention.
Figure 10:
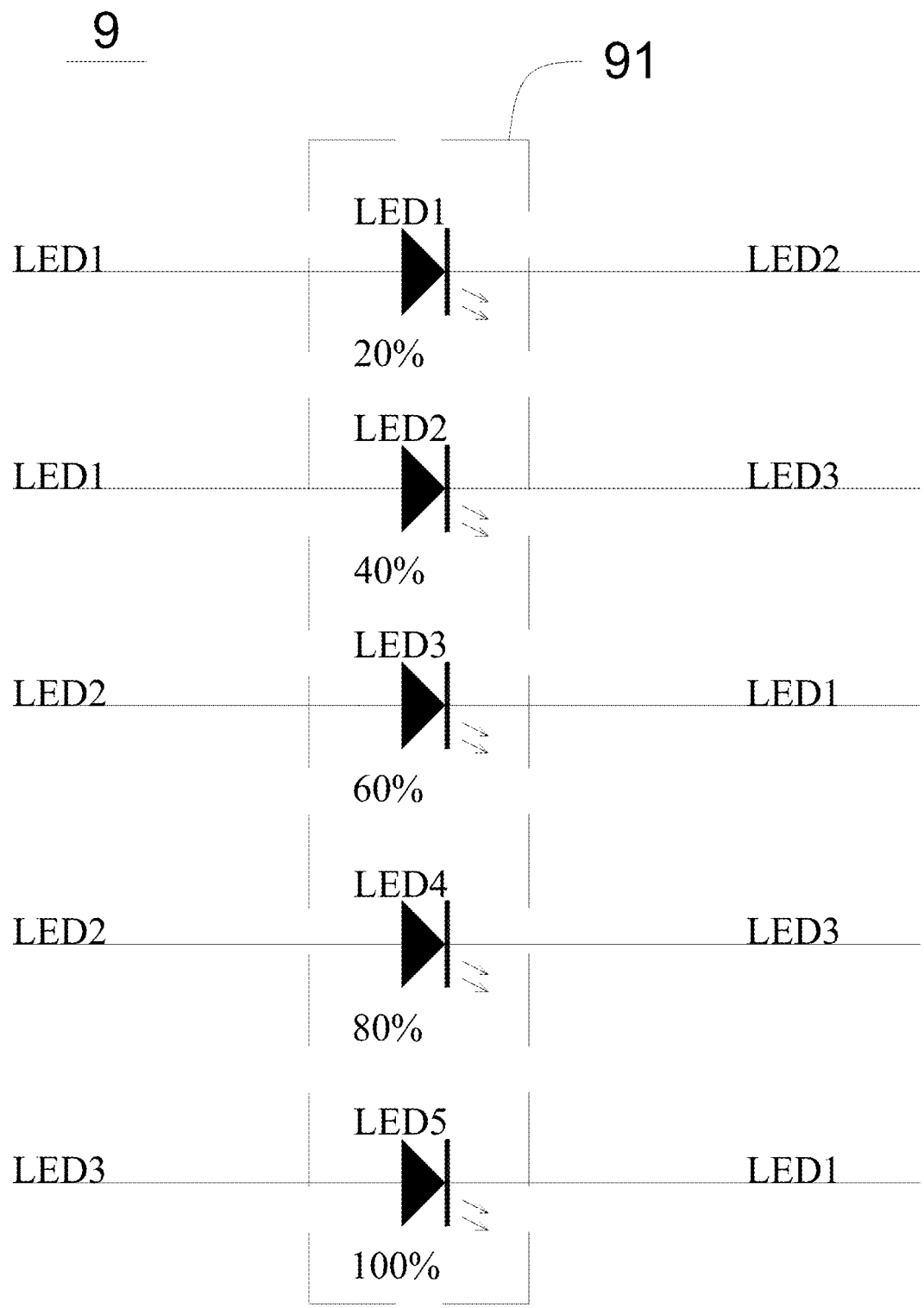
FIG. 10 is a circuit diagram of an indicator unit of the present invention.
Figure 11:
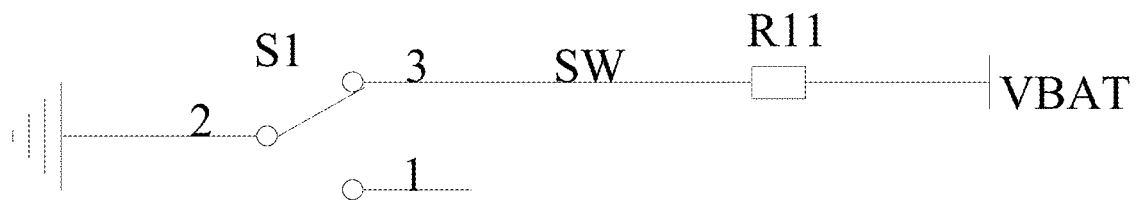
FIG. 11 is a circuit diagram of a switch unit of the present invention.
Figure 12:
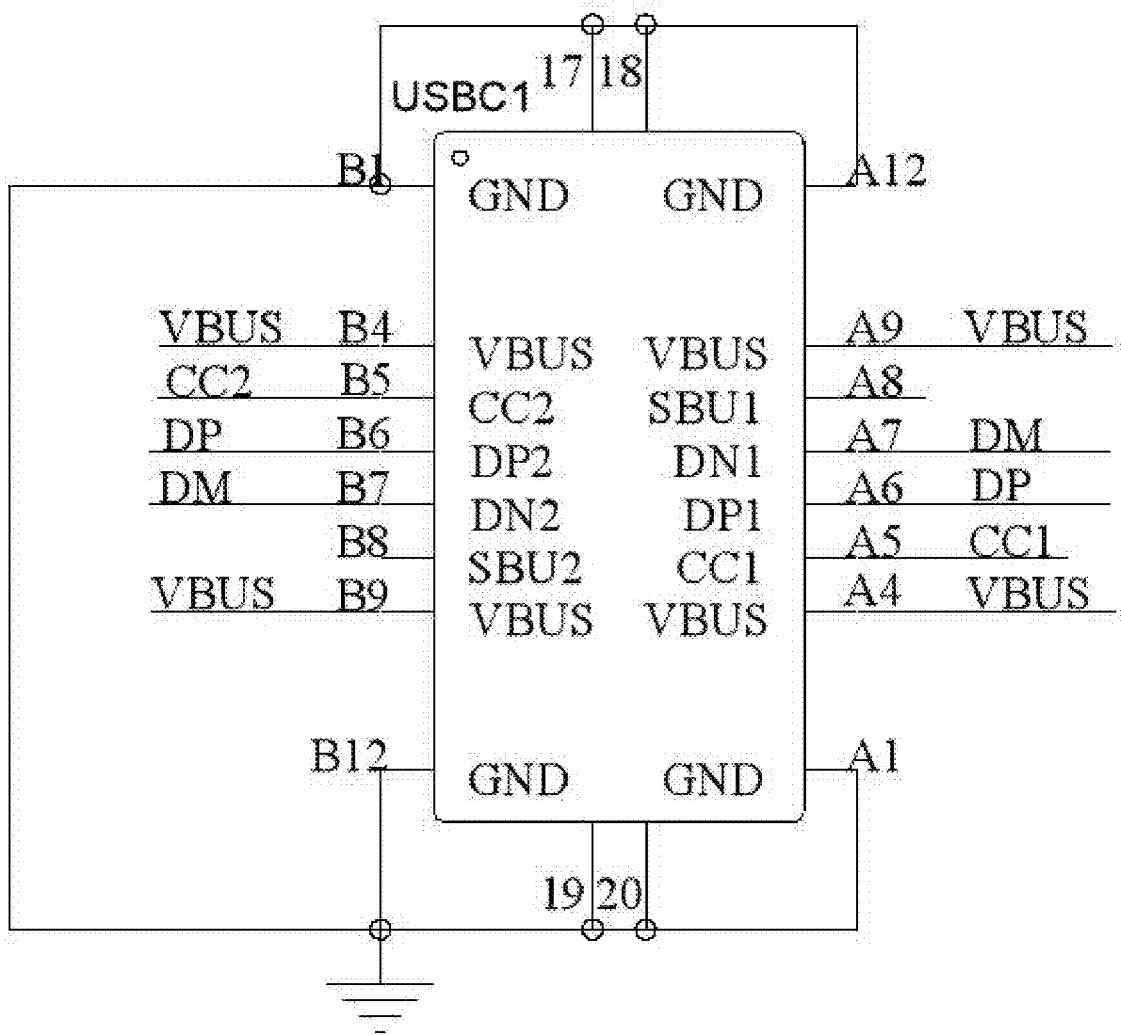
FIG. 12 is a circuit diagram of a power interface according to another embodiment of the present invention.
Figure 13:
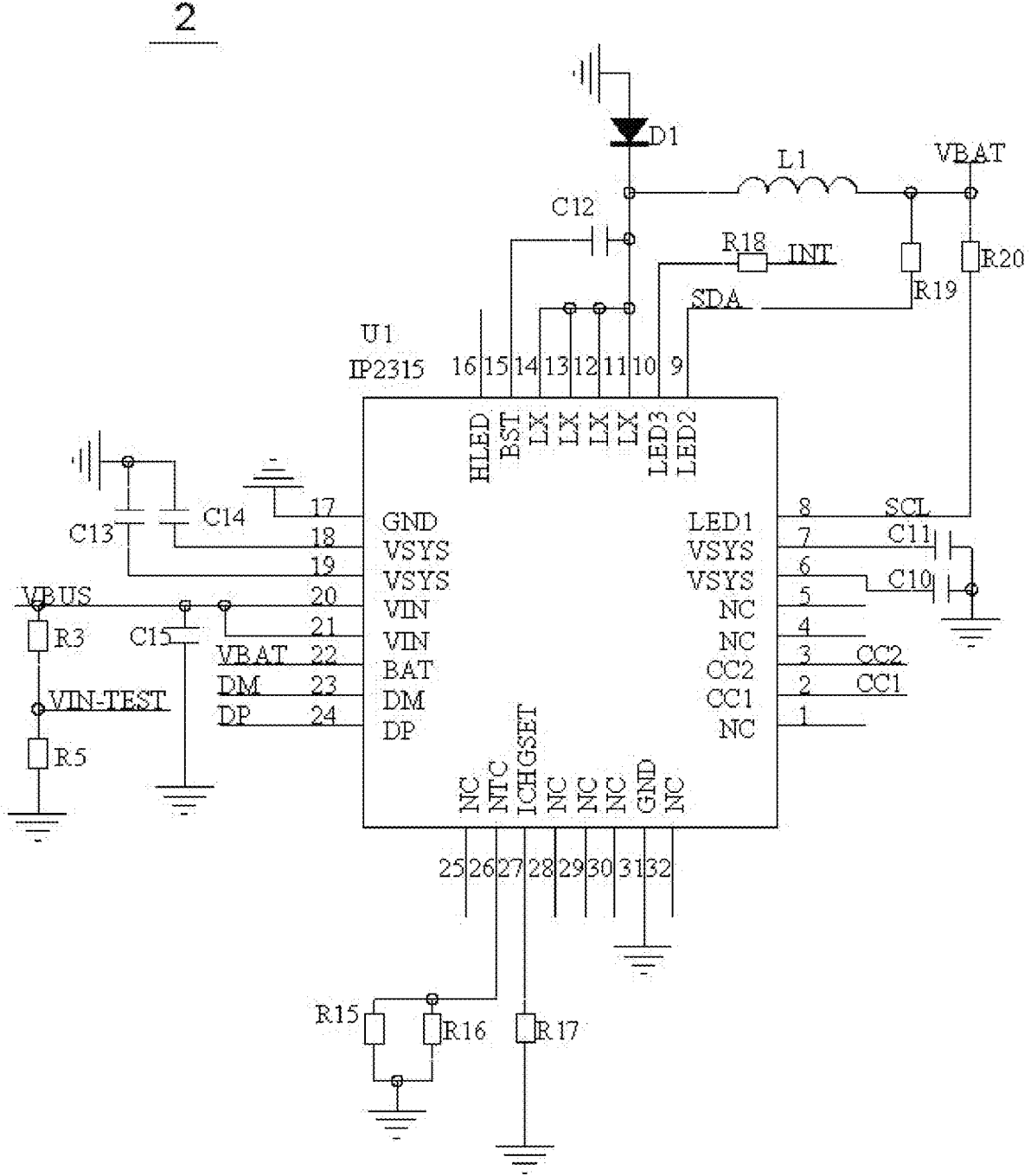
FIG. 13 is a circuit diagram of a charging unit according to another embodiment of the present invention.
Figure 14:
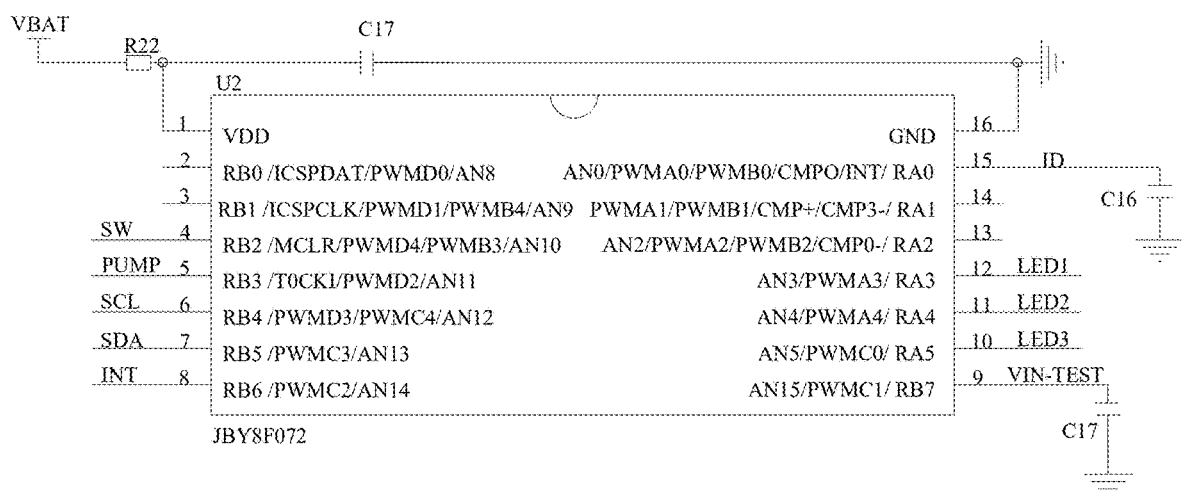
FIG. 14 is a circuit diagram a main control unit according to another embodiment of the present invention.
Figure 15:
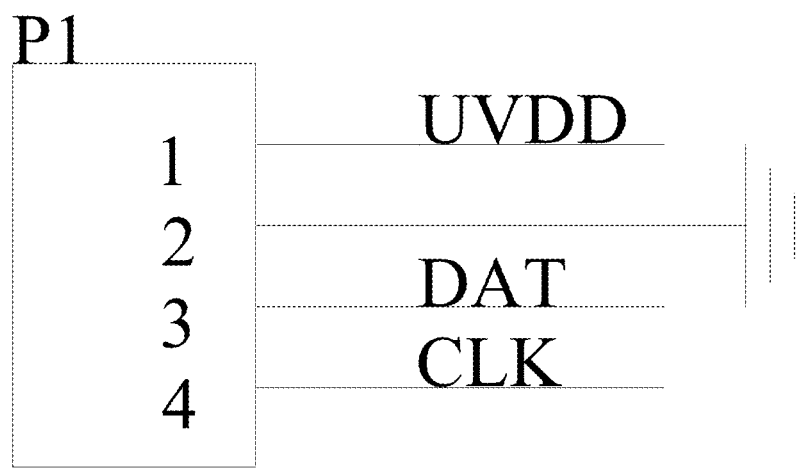
FIG. 15 is a circuit diagram of a programming port of the present invention.

Referring to FIGS. 1-15, a portable oil pump 100 with a charging function is provided in an embodiment of the present invention.

The portable oil pump 100 includes a main unit 10, an oil pumping pipe 20, a pump body 4, and an oil outlet pipe 30. The oil pumping pipe 20 is connected to the main unit 10. The oil outlet pipe 30 is connected to a position of the oil pumping pipe 20 adjacent to the main unit 10 and is in communication with the oil pumping pipe 20. The pump body 4 is arranged inside the oil pumping pipe 20 at one end away from the main unit 10. The main unit 10 is equipped with a circuit board 102, a battery 3, and a power interface 1. The battery 3 is a rechargeable battery 3. A charging unit 2, a main control unit 6 and a driving unit 7 are integrated on the circuit board 102. The charging unit 2 is electrically connected to the power interface 1, the main control unit 6, and the battery 3, respectively. The main control unit 6 is electrically connected to the charging unit 2, the driving unit 7, and the battery 3, respectively. The battery 3 is electrically connected to the driving unit 7, the charging unit 2, and the pump body 4, respectively. The power interface 1 is used for connecting to a first power signal and transmitting the connected first power signal to the charging unit 2. The charging unit 2 is used for converting the first power signal into a second power signal for charging the battery 3. The main control unit 6 controls the on-off of the power supply from the battery 3 to the pump body 4 through the driving unit 7. A voltage range of a power source connected to the power interface 1 is 5V-75V.

In this embodiment, the rechargeable battery 3 is built in the main unit 10, and the power interface 1 and the charging unit 2 adapted to charge the battery 3 are provided. After the power interface 1 is connected to the power source, the battery 3 can be charged through the charging unit 2, enabling the battery 3 to continue to be used without replacing the battery 3, which plays a role in environmental protection. Moreover, the rechargeable battery 3 provides a more stable output voltage compared with a dry battery, and the output voltage will not be affected by the decrease of a battery level of the battery 3. Therefore, the battery 3 can provide a relatively stable voltage to the pump body 4, thereby maintaining the oil pumping rate of the pump body 4, and solving the problem that the oil pumping rate of the pump body 4 is affected due to an unstable output power after existing oil pumps are powered by dry batteries and used over time or left unused for a long time.

Specifically, when the pump body 4 works, oil is drawn into the oil pumping pipe 20 and discharged through the oil outlet pipe 30.

The dry battery relies on an internal absorbent to convert a contained substance into a pasty substance, thereby generating electrical energy. Moreover, the electrical energy decreases as it is used, that is, the output voltage and current will drop as the electrical energy decreases, thereby affecting the output voltage. In this embodiment, the battery 3 preferably is a lithium battery 3. The lithium battery 3 achieves the conversion between electrical energy and chemical energy through the cyclic conversion of internal active substances, thereby discharging and charging. In addition, a voltage and an output current of the lithium battery 3 are usually relatively stable, which can provide power output for a longer time to ensure the stable operation of the pump body 4 and maintain the oil pumping rate of the pump body 4.

The charging unit 2 includes a battery charging chip U1 and an inductor L1. The battery charging chip U1 is electrically connected to the battery 3 through the inductor L1. The battery charging chip U1 is electrically connected to the power interface 1. The battery charging chip U1 is used for converting the first power signal output from the power interface 1 into the second power signal and then charging the battery 3 through the inductor L1. In cooperation with the inductor L1, the battery charging chip U1 converts the first power signal input from the power interface 1 into electrical energy suitable for the battery 3, so as to charge the battery 3.

In one embodiment, the circuit board 102 also integrates a power detection unit 5. The power detection unit 5 includes a first resistor R3 and a second resistor R5. The battery charging chip U1 is grounded sequentially through the first resistor R3 and the second resistor R5. An input terminal of the first resistor R3 is also electrically connected to the power interface 1, and an output terminal of the first resistor R3 is electrically connected to the main control unit 6. When the power interface 1 is connected to the first power signal via an adapter, a detection signal can be fed back to the main control unit 6 after voltage division by the first resistor R3 and the second resistor R5, and the main control unit 6 determines that the power interface 1 is connected to a power source according to the detection signal. When the power interface 1 is connected to the power supply, the main control unit 6 can stop driving the pump body 4 through the driving unit 7. Alternatively, in an embodiment with an indicator unit 9 for indicating a battery level of the battery 3, the main control unit 6 can also drive the indicator unit 9 to work according to the detection signal.

In one embodiment, the battery charging chip U1 is a power management chip. The charging unit 2 further includes a first capacitor C1, a second capacitor C4, a third capacitor C3, a third resistor R6, and a fourth resistor R10. A VIN pin of the battery charging chip U1 is electrically connected to the power interface 1. An LED1 pin of the battery charging chip U1 is electrically connected to the main control unit 6. An LED2 pin and an LED3 pin of the battery charging chip U1 are both electrically connected to the battery 3 through the third resistor R6. A VOUT pin of the battery charging chip U1 is grounded through the first capacitor C1. An SW pin of the battery charging chip U1 is electrically connected to the battery 3 through the inductor L1. A BAT pin of the battery charging chip U1 is grounded through the second capacitor C4. The BAT pin of the battery charging chip U1 is also electrically connected to the battery 3 through the fourth resistor R10. Two terminals of the third capacitor C3 are electrically connected to an output terminal of the second capacitor C4 and an output terminal of the inductor L1, respectively. By configuring the first capacitor C1, the second capacitor C4, the third capacitor C3, the third resistor R6, and the fourth resistor R10, the battery charging chip U1 can output stable voltage and current to charge the battery 3 and enable the battery charging chip U1 to work normally.

Specifically, the battery charging chip U1 can be an IP5306 model chip. By using the battery charging chip U1 of this model, after the first power signal connected by the power interface 1 is converted by the battery charging chip U1 and passes through the inductor L1, a voltage of 5V and a current of 2 A can be output to the battery 3. Of course, in other embodiments, the battery charging chip U1 can be a chip of models such as IP5316 and IP5508.

The chip of the IP5306 model is a multi-functional power management SOC integrated with a boost converter, lithium battery charging management, and battery level indication, which can achieve dual functions of reducing voltage and boosting up voltage only by one inductor L1, and can automatically enter a sleep mode in a no-load state to save energy. In addition, the chip also employs an efficient switching charging technology, capable of providing a maximum charging current of 2.1 A with a charging efficiency of up to 91%. Additionally, the chip also supports battery level indication using four LED lights, allowing the user to intuitively understand the battery level information of the battery 3.

In the above embodiments, the power interface 1 can be a TYPE-C interface, a Micro interface, a Lightning interface, a DC power socket, etc. In other embodiments, the battery charging chip U1 outputs a voltage of 5V and a current of 1 A to the battery 3 through the inductor L1. A manufacturer can, according to different battery charging chips U1 adopted, enable the power interface 1 to connect to the first power signals with different voltages and different currents and output different charging voltages and charging currents to the battery 3.

In one embodiment, the power interface 1 is a TYPE-C interface. The battery charging chip U1 supports a fast charging protocol, a voltage supported by the battery charging chip U1 for input ranges from 5V to 75V The manufacturer can, according to different battery charging chips U1 adopted, enable the power interface 1 to connect to the first power signals with different voltages and different currents and output different charging voltages and charging currents to the battery 3, so as to increase the charging rate of the battery 3.

The battery charging chip U1, when detecting a protocol signal connected to the power interface 1 through a CC pin of the battery charging chip U1, converts the first power signal input from the power interface 1 into a charging voltage and a charging current that match the protocol, and outputs the charging voltage and the charging current to the battery 3.

In one embodiment, the battery charging chip U1 supports status indication for a plurality of LED lights during charging and is capable of identifying a total number of the LED lights. When the battery charging chip U1 is configured with the LED lights, the battery charging chip U1 can be used for indicating the battery level of the battery 3 for user use.

In one embodiment, the battery charging chip U1 supports NTC-based charging temperature protection to stop charging the battery 3 when the battery 3 reaches a certain temperature during charging, so as to prevent damage to the battery 3 or safety hazards caused by excessive temperature, thereby playing a protective role. The battery charging chip U1 also supports over-voltage protection for an input voltage to avoid damage to other components caused by excessive input voltage. The battery charging chip U1 supports self over-temperature protection to stop charging the battery 3 when its own temperature is too high, so as to reduce the temperature and avoid damage to itself and the battery 3 caused by high temperature.

In one embodiment, the battery charging chip U1 is an IP2315 model chip. This chip can support input fast charging protocols including Type-C PD, Huawei FCP, Samsung AFC, and MTK PE+1.1/2.0, and support an input voltage ranging from 5V to 12V. The charging voltage output by the battery charging chip U1 to the battery 3 is the voltage of the battery 3, and the current output to the battery 3 is less than 4.8 A. When the voltage input by the power interface 1 is 9V and the current is 2 A, the battery charging chip U1 can output a voltage of 3.7V and a current of 4.8 A to the battery 3 through the inductor L1. Moreover, in this embodiment, the circuit board 102 also integrates a programming port P1 used for flashing a program to the battery charging chip U1, and the programming port P1 facilitates upgrading the program for the battery charging chip U1. Of course, the manufacturer can also use other types of chips to support different fast charging protocols and support input of different voltages. For example, when the battery charging chip U1 is a chip of an XSPO4 model, an input voltage ranging from 3.3V to 40V may be supported. When the battery charging chip U1 is a chip of an HUSB368 model, a voltage ranging from 5V to 48V may be supported. When the battery charging chip U1 is a QC2.0 fast charging chip, an input voltage ranging from 9V to 100V may be supported, and the like.

In one embodiment, the main unit 10 is equipped with a switch unit 8 electrically connected to the main control unit 6. The switch unit 8 is used for user operation and feeds back a switch signal to the main control unit 6 during user operation. The main control unit 6 controls the on-off of the power supply from the battery 3 to the pump body 4 through the driving unit 7 based on the switch signal. By configuring an operating member 101 to be adapted to the switch unit 8 for use, the user can control the activation or deactivation of the pump body 4.

In one embodiment, the switch unit 8 includes a switch element Si and a fifth resistor R11. A positive electrode of the battery 3 is grounded sequentially through the fifth resistor R11 and the switch element Si. The switch element Si is used for user operation. The main control unit 6 is electrically connected to an output terminal of the fifth resistor R11. When the user controls the switch element Si to close through the operating member 101, a voltage at a pin of the main control unit 6 connected to the output terminal of the fifth resistor R11 is pulled low. The main control unit 6 drives the pump body 4 to work through the driving unit 7 based on this voltage, and vice versa, stops driving the pump body through the driving unit 7. Specifically, the switch unit 8 can be a DIP switch, a button switch, a touch switch, etc.

In one embodiment, the driving unit 7 includes a switching device Q1. A first terminal of the switching device Q1 is electrically connected to the pump body 4. A control terminal of the switching device Q1 is electrically connected to the main control unit 6. A second terminal of the switching device Q1 is grounded. That is, when the switch element Si is closed, the main control unit 6 controls the switching tube Q1 to conduct, and in conjunction with the positive electrode of the battery 3 being electrically connected to an input terminal of the pump body 4, the pump body 4 can be powered on for work.

In one embodiment, the main unit 10 is equipped with an operating member 101 for user operation. The operating member 101 is connected to the switch element Si. When the operating member 101 is operated, the switch element Si feeds back a switch signal to the main control unit 6 or stops feeding back the switch signal to the main control unit 6.

In one embodiment, the main unit 10 is in a column shape and extends along a length direction of the oil pumping pipe 20, that is, the main unit 10 can be used as a handle for the user to grip by hand, making it convenient for the user to take and use the portable oil pump 100 of this embodiment.

In one embodiment, the operating member 101 and the power interface 1 are both positioned at a top portion of the main unit 10, so as to prevent the user from accidentally triggering the operating member 101 and causing the pump body 4 to operate when holding the main unit 10. In this embodiment, the circuit board 102 is positioned above the battery 3 to facilitate the configuration of the power interface 1 and the switch element Sl, reducing wiring. Of course, in other embodiments, the operating member 101 and the power interface 1 can also be arranged on a side wall of the main unit 10, and the battery 3 can be positioned above the circuit board 102, etc.

In one embodiment, the driving unit 7 further includes a sixth resistor R7 and a seventh resistor R4. A second terminal of the switching device Q1 is grounded through the sixth resistor R7. A first terminal of the seventh resistor R4 is electrically connected to the second terminal of the switching device Q1, and a second terminal of the seventh resistor R4 is electrically connected to the main control unit 6. The main control unit 6 adjusts a voltage output to the control terminal of the switching device Q1 based on a first electrical signal fed back from the seventh resistor R4 to regulate a conduction duty cycle of the switching device Q1. Through the sixth resistor R7 and the seventh resistor R4, a current magnitude after the conduction of the switching device Q1 can be fed back to the main control unit 6, so that the main control unit 6 can control the conduction duty cycle of the switching device Q1 based on the current. In conjunction with the electrical connection between the positive electrode of the battery 3 and the input terminal of the pump body 4, stable power can be output to the pump body 4, so that the pump body 4 can work stably. Of course, the main control unit 6 can also adjust the conduction duty cycle of the switching device Q1 based on the user's operation of the switch element Si via the operating member 101 and based on the first electrical signal, so as to regulate the power output to the pump body 4 to control the oil pumping rate of the pump body 4. In this embodiment, the switch element Si can be a potentiometer or an encoder, etc.

In one embodiment, the driving unit 7 further includes an eighth resistor R1 and a ninth resistor R2. The control terminal of the switching device Q1 is electrically connected to the main control unit 6 through the eighth resistor R1. A first terminal of the ninth resistor R2 is connected to the control terminal of the switching device Q1. A second terminal of the ninth resistor R2 is electrically connected to the second terminal of the switching device Q1. When the switching device Q1 is turned on and off, due to the presence of an internal parasitic capacitance, an instantaneous current is relatively large. The eighth resistor R1 is capable of limiting this instantaneous current to prevent damage to the main control unit 6 caused by excessive current. By using the ninth resistor R2, the static electricity present on the switching device Q1 can be discharged, preventing the switching device Q1 from being falsely triggered or broken down by high voltage.

Specifically, the switching device Q1 can be an N-channel MOSFET. That is, the first terminal of the switching device Q1 is a drain, and the second terminal of the switching device Q1 is a source. Of course, in other embodiments, the switching device Q1 can also be a P-channel MOSFET, that is, the first terminal of the switching device Q1 is the source, and the second terminal of the switching device Q1 is the drain. Alternatively, the switching device Q1 can also be a transistor or the like.

In one embodiment, the circuit board 102 also integrates a diode D1. An input terminal of the diode D1 is electrically connected to an output terminal of the pump body 4. An output terminal of the diode D1 is electrically connected to an input terminal of the pump body 4. When a motor of the pump body 4 works, a magnetic field is generated, and when the power supply is disconnected, the magnetic field will generate electric energy to form a back electromotive force (back-EMF). The diode D1 is designed to provide a conduction path when the back-EMF is generated, so as to form a loop to prevent a voltage pulse of the back-EMF from affecting or damaging other components.

In one embodiment, the circuit board 102 also integrates an indicator unit 9. The indicator unit 9 includes a plurality of indicator lights 91 (LED1, LED2, LED3, LED4, LED5) electrically connected to the main control unit 6. The main control unit 6 compares a voltage output from the battery 3 with an internal reference voltage of the main control unit 6 to determine a remaining battery level of the battery 3, and drives a corresponding number of indicator lights 91 to light up based on the battery level of the battery 3. According to a total number of illuminated indicator lights 91, the user can easily determine the remaining battery level of the battery 3 and thus charge the battery 3 in a timely manner when the battery level of the battery 3 is low.

Specifically, the main control unit 6 itself has a reference voltage, that it, the remaining battery level of the battery 3 can be determined according to the voltage output by the battery 3. In this embodiment, a total number of the indicator lights 91 is five. When the remaining battery level of the battery 3 is about 20%, the main control unit 6 drives one indicator light 91 to light up. When the remaining battery level of the battery 3 is about 40%, the main control unit 6 simultaneously drives two indicator lights 91 to light up. When the remaining battery level of the battery 3 is about 60%, the main control unit 6 simultaneously drives three indicator lights 91 to light up. When the remaining battery level of the battery 3 is about 80%, the main control unit 6 simultaneously drives four indicator lights 91 to light up. When the remaining battery level of the battery 3 is about 100%, the main control unit 6 simultaneously drives five indicator lights 91 to light up. Of course, in other embodiments, the total number of the indicator lights 91 may also be two, four, six, etc.

In one embodiment, the battery charging chip U1 is also used for feeding back a charging indication signal CHG to the main control unit 6 when charging the battery 3. The main control unit 6 drives one or more indicator lights 91 to flash according to the charging indication signal CHG. It should be understood that when the battery 3 is charged, the main control unit 6 is capable of driving the indicator light 91 to flash. For example, when the battery level of the battery 3 reaches 20%, the main control unit 6 drives one indicator light 91 to light up and drives another indicator light 91 to flash, or drives a plurality of indicator lights 91 to light up circularly.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A portable oil pump with a charging function, comprising:
    a main unit;
    an oil pumping pipe;
    a pump body; and
    an oil outlet pipe;
    wherein the oil pumping pipe is connected to the main unit; the oil outlet pipe is connected to a position of the oil pumping pipe adjacent to the main unit and is in communication with the oil pumping pipe; the pump body is arranged inside the oil pumping pipe at one end away from the main unit; the main unit is equipped with a circuit board, a battery, and a power interface; and the battery is a rechargeable battery;
    a charging unit, a main control unit and a driving unit are integrated on the circuit board; the charging unit is electrically connected to the power interface, the main control unit, and the battery, respectively; the main control unit is electrically connected to the charging unit, the driving unit, and the battery, respectively; and the battery is electrically connected to the driving unit, the charging unit, and the pump body, respectively;
    the power interface is used for connecting to a first power signal and transmitting the connected first power signal to the charging unit; the charging unit is used for converting the first power signal into a second power signal for charging the battery; the main control unit controls the on-off of the power supply from the battery to the pump body through the driving unit; and a voltage range of a power source connected to the power interface is 5V-75V.

2. The portable oil pump with the charging function according to claim 1, wherein the battery is a lithium battery; the charging unit comprises a battery charging chip and an inductor; the battery charging chip is electrically connected to the battery through the inductor; the battery charging chip is electrically connected to the power interface; and the battery charging chip is used for converting the first power signal output from the power interface into the second power signal and then charging the battery through the inductor.

3. The portable oil pump with the charging function according to claim 2, wherein the circuit board also integrates a power detection unit; the power detection unit comprises a first resistor and a second resistor; the battery charging chip is grounded sequentially through the first resistor and the second resistor; an input terminal of the first resistor is also electrically connected to the power interface; an output terminal of the first resistor is electrically connected to the main control unit; and the main control unit determines that the power interface is connected to a power source according to a detection signal fed back by the first resistor.

4. The portable oil pump with the charging function according to claim 3, wherein the battery charging chip outputs a voltage of 5V and a current of 2 A to a battery through an inductor.

5. The portable oil pump with the charging function according to claim 3, wherein the battery charging chip is a power management chip; the charging unit further comprises a first capacitor, a second capacitor, a third capacitor, a third resistor, and a fourth resistor; a VIN pin of the battery charging chip is electrically connected to the power interface; an LED1 pin of the battery charging chip is electrically connected to the main control unit; an LED2 pin and an LED3 pin of the battery charging chip are both electrically connected to a battery through the third resistor; a VOUT pin of the battery charging chip is grounded through the first capacitor; an SW pin of the battery charging chip is electrically connected to the battery through an inductor; a BAT pin of the battery charging chip is grounded through the second capacitor; the BAT pin of the battery charging chip is also electrically connected to the battery through the fourth resistor; and two terminals of the third capacitor are electrically connected to an output terminal of the second capacitor and an output terminal of the inductor, respectively.

6. The portable oil pump with the charging function according to claim 5, wherein the battery charging chip is an IP5306 model chip.

7. The portable oil pump with the charging function according to claim 3, wherein the power interface is a TYPE-C interface.

8. The portable oil pump with the charging function according to claim 7, wherein the battery charging chip supports a fast charging protocol; and a voltage supported by the battery charging chip for input ranges from 5V to 75V;
    the battery charging chip, when detecting a protocol signal connected to the power interface through a CC pin of the battery charging chip, converts a first power signal input from the power interface into a charging voltage and a charging current that match the protocol, and outputs the charging voltage and the charging current to a battery.

9. The portable oil pump with the charging function according to claim 8, wherein the battery charging chip supports status indication for a plurality of LED lights during charging and is capable of identifying a total number of the LED lights.

10. The portable oil pump with the charging function according to claim 8, wherein the battery charging chip supports NTC-based charging temperature protection, supports over-voltage protection for an input voltage, and supports self over-temperature protection.

11. The portable oil pump with the charging function according to claim 10, wherein the battery charging chip is an IP2315 model chip.

12. The portable oil pump with the charging function according to claim 1, wherein the main unit is equipped with a switch unit electrically connected to the main control unit; the switch unit is used for user operation and feeds back a switch signal to the main control unit during user operation; and the main control unit controls the on-off of the power supply from the battery to the pump body through the driving unit based on the switch signal.

13. The portable oil pump with the charging function according to claim 12, wherein the switch unit comprises a switch element and a fifth resistor; a positive electrode of the battery is grounded sequentially through the fifth resistor and the switch element; the switch element is used for user operation; and the main control unit is electrically connected to an output terminal of the fifth resistor.

14. The portable oil pump with the charging function according to claim 1, wherein the driving unit comprises a switching device; a first terminal of the switching device is electrically connected to the pump body; a control terminal of the switching device is electrically connected to the main control unit; and a second terminal of the switching device is grounded.

15. The portable oil pump with the charging function according to claim 14, wherein the main unit is equipped with an operating member for user operation; the operating member is connected to the switch element; when the operating member is operated, the switch element feeds back a switch signal to the main control unit or stops feeding back the switch signal to the main control unit;

the operating member and the power interface are both positioned at a top portion of the main unit; the circuit board is positioned above the battery; and the main unit is in a column shape and extends along a length direction of the oil pumping pipe.

16. The portable oil pump with the charging function according to claim 14, wherein the driving unit further comprises a sixth resistor and a seventh resistor; a second terminal of the switching device is grounded through the sixth resistor; a first terminal of the seventh resistor is electrically connected to the second terminal of the switching device; and a second terminal of the seventh resistor is electrically connected to the main control unit; and the main control unit adjusts a voltage output to the control terminal of the switching device based on a first electrical signal fed back from the seventh resistor to regulate a conduction duty cycle of the switching device.

17. The portable oil pump with the charging function according to claim 14, wherein the driving unit further comprises an eighth resistor and a ninth resistor; the control terminal of the switching device is electrically connected to the main control unit through the eighth resistor; a first terminal of the ninth resistor is connected to the control terminal of the switching device;

and a second terminal of the ninth resistor is electrically connected to the second terminal of the switching device.

18. The portable oil pump with the charging function according to claim 14, wherein the circuit board also integrates a diode; an input terminal of the diode is electrically connected to an output terminal of the pump body; and an output terminal of the diode is electrically connected to an input terminal of the pump body.

19. The portable oil pump with the charging function according to claim 2, wherein the circuit board also integrates an indicator unit; the indicator unit comprises a plurality of indicator lights electrically connected to the main control unit; the main control unit compares a voltage output from the battery with an internal reference voltage of the main control unit to determine a remaining battery level of the battery, and drives a corresponding number of indicator lights to light up based on the battery level of the battery.

20. The portable oil pump with the charging function according to claim 19, wherein the battery charging chip is also used for feeding back a charging indication signal to the main control unit when charging the battery; and the main control unit drives one or more indicator lights to flash according to the charging indication signal.

* * * * *